(12) United States Patent
Haapakoski et al.

(10) Patent No.: US 6,597,352 B1
(45) Date of Patent: Jul. 22, 2003

(54) METHOD AND DEVICE FOR FILTERED SYNC DETECTION

(75) Inventors: Hannu Haapakoski, Salo (FI); Vesa Salonen, Salo (FI); Kari Vigelius, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/305,525

(22) Filed: May 5, 1999

(51) Int. Cl.[7] .................................................. G09G 5/00
(52) U.S. Cl. ...................................................... 345/211
(58) Field of Search ................................ 345/211, 212, 345/213, 214; 327/24, 41; 348/500

(56) References Cited

U.S. PATENT DOCUMENTS

| | | | |
|---|---|---|---|
| 4,064,541 A | 12/1977 | Schneider et al. | |
| 4,084,187 A | 4/1978 | Schlotzhauer et al. | |
| 4,535,294 A | 8/1985 | Ericksen et al. | 328/150 |
| 4,580,166 A | 4/1986 | Okano | |
| 4,677,388 A | 6/1987 | Morrison | |
| 5,218,533 A * | 6/1993 | Schanen | 364/413.15 |
| 5,519,444 A * | 5/1996 | Ko et al. | 348/515 |
| 5,754,250 A | 5/1998 | Cooper | |
| 5,798,730 A * | 8/1998 | Sanchez | 342/195 |
| 6,018,273 A * | 1/2000 | Tsyrganovich | 331/2 |

FOREIGN PATENT DOCUMENTS

EP           1 051 029 A2 *   8/2000

* cited by examiner

*Primary Examiner*—Richard Hjerpe
*Assistant Examiner*—Ronald Laneau
(74) *Attorney, Agent, or Firm*—Ware, Fressola, Van der Sluys & Adolphson LLP

(57) ABSTRACT

A method and a device for filtered sync signals detection wherein a timing circuit is used to select the steep slope portion in one or both of the leading edge and the trailing edge of the sync signals; a voltage divider or feedback path to set a triggering point at the steep slope portion of the selected edge regardless the slope being positive or negative; and a triggerable device is used to generate new sync signals with the leading edge of each sync pulse starts at one triggering point and the trailing edge starts at another triggering point. Alternatively, a micro-controller is used to detect the polarity of the sync signals and accordingly provide a reference voltage in order to set the triggering point at the leading edge of the sync signals.

38 Claims, 4 Drawing Sheets

METHOD AND DEVICE FOR FILTERED SYNC DETECTION

FIELD OF THE INVENTION

The present invention relates to video synchronization input signals provided to a computer monitor or a video display unit.

BACKGROUND OF THE INVENTION

In a computer display or monitor, the main purpose of having horizontal synchronization pulses (H-sync) is to provide an accurate timing reference point to the horizontal scan circuit. In most of the cases, the sync pulses are fed from the CPU of a computer system into the monitor via a cable. This cable may contain a variety of signals that the monitor needs to show an image. The signal level of the H-sync is normally provided at +5V, but it may also be provided at about +3V depending on the transistor logic of the sync pulse generator. The triggering level that is used by the horizontal scan circuit in a monitor to start a horizontal scan is usually adopted from the TTL-standard. The polarity of the H-sync signals can be positive or negative. The horizontal sync signals, along with the vertical sync signals, are also used for power management to save electrical power in a monitor. The signaling between a CPU to a monitor is described in VESA (Video Electronics Standards Association) Display Power Management Standard (DPMS).

The stability of the video scan lines and the quality of the displayed image on a monitor depends on how precisely the line deflection is locked on the H-sync signals. In order to insure a good quality of the displayed image on the monitor, the horizontal scan circuit in the monitor should be immune to noise and interference which may exist in the cable connecting the CPU and the monitor. For that reason, it is important to choose the trigger level correctly.

Usually video synchronization signals are buffered by means of a TFL-compatible logic IC. For example, the 74HCT-series logic is often used for buffering H-sync signals. The H-sync signals can be fed directly into a deflection control IC (e.g. TDA9109) or into a micro-controller (e.g. ST7275) of the monitor which includes sync buffering. In these cases the triggering level is a fixed value, within a specified range of +0.8 to 2.2V. It is well known that a sync pulse has a leading edge and a trailing edge and either edge can be used to trigger a line scan. Because of the wiring capacitance in the connection cable, neither edge is very sharp as the pulse transients in the sync pulse are caused by the capacitance to slow down exponentially. As can be seen from FIGS. 1A and 1B, each of the edges of the sync pulse has a steep slope portion leading to a gradual slope portion. If the triggering level is located within the steep slope portion of the edge, the horizontal scan is reasonably immune to noise and interference. If the triggering level is located in the gradual slope portion, the horizontal scan is more susceptible to noise. In the latter case, noise and interference may cause a jitter in the horizontal scanning frequency and the overall instability of the displayed image. As shown in FIG. 1A, the polarity of the sync pulses is positive and the triggering level is located within the steep slope portion of the leading edge. However, on the trailing edge, the triggering level is located at the gradual slope portion, and, in this case, the trailing edge may not be suitable to be used as the triggering means for horizontal scans. The opposite is true for the sync pulses of negative polarity. As shown in FIG. 1B, the triggering level is located within the steep slope portion of the trailing edge, but in the gradual slope portion of the leading edge. Depending on which edge is used for triggering, the jitter in the horizontal scanning frequency may yield unacceptable visual effects, especially in high end monitors.

The typical length of the cable which is used to connect a CPU to a monitor for providing video signals is about 1.5 meter. The capacitance of the cable is usually large enough to distort the sync pulses, causing unacceptable visual effects, especially in high-end monitors having a high synchronization frequency over 60 kHz. Moreover, cable impedance and the input impedance of the sync inputs of the display are not standardized. Thus, the output impedance of the display driver in the CPU, the impedance of the cable, and the input impedance of the display may not match to each other. This impedance mismatch also distorts sync pulses. The problem of sync pulse distortions occurs not only in a computer system having a cable to provide video information from the CPU to the video display, but also occurs in video equipment having a cable for connection and for carrying sync lines.

It is desirable to provide a method and a device to improve the synchronization in the horizontal scanning in a monitor or video equipment, regardless of the polarity of the synchronization signals.

SUMMARY OF THE INVENTION

It is an objective of the present invention to improve the consistency in line scanning in a video display device and the stability of the horizontal scanning frequency.

This objective can be achieved by providing a filtered sync signals detector between the H-sync signal input and the horizontal scan circuit of a monitor or video equipment. The method and device for filtered sync signals detection, according to the present invention, is to sort out the steep slope portion of one or both of the edges of an incoming H-sync pulse and set a triggering point in the steep portion of the edges.

The method and device for filtered sync detection, according to one version of the present invention, use a timing filter, such as an RC timing circuit, to select the steep slope portion of one or both of the edges in an incoming sync pulse, a voltage divider to set a triggering point within the steep slope portion of the selected edge, regardless of the slope being negative or positive, and a triggerable device or voltage comparator to generate a new sync pulse substantially in the form of a rectangular wave having a first edge and a second edge, wherein at least the first edge starts substantially at a triggering point.

The method and device for filtered sync detection, according to another version of the present invention, use a timing circuit to filter out the sync pulses in the incoming sync signals. The filtered signals are provided as a reference voltage to one input terminal of a voltage comparator, while the incoming sync signals are provided to the other input terminal of the voltage comparator. These signals are fed to the voltage comparator in order to adjust, or tune, the triggering point within the steep slope portion of the leading edge of the incoming signals.

In yet another version of the present invention, a voltage comparator is used as a triggerable device for generating new sync pulses from the incoming signals. A micro-controller is used to detect the polarity of the incoming sync pulses and accordingly provide a reference voltage to the voltage comparator in order to tune the triggering point within the steep slope portion of the triggering edge of an incoming sync pulse. The micro-controller receives signals from the output of the voltage comparator or from a deflection circuit for polarity detection. Based on the DC level of the incoming signals, the micro-processor provides a reference voltage level between the DC level and the sync pulse amplitude such that the difference between the reference voltage and the DC level is an appropriately small value.

The filtered sync signals detection method and device will become apparent upon reading the drawings and the accompanying descriptions.

DETAILED DESCRIPTION OF THE INVENTION

Figure 1A:
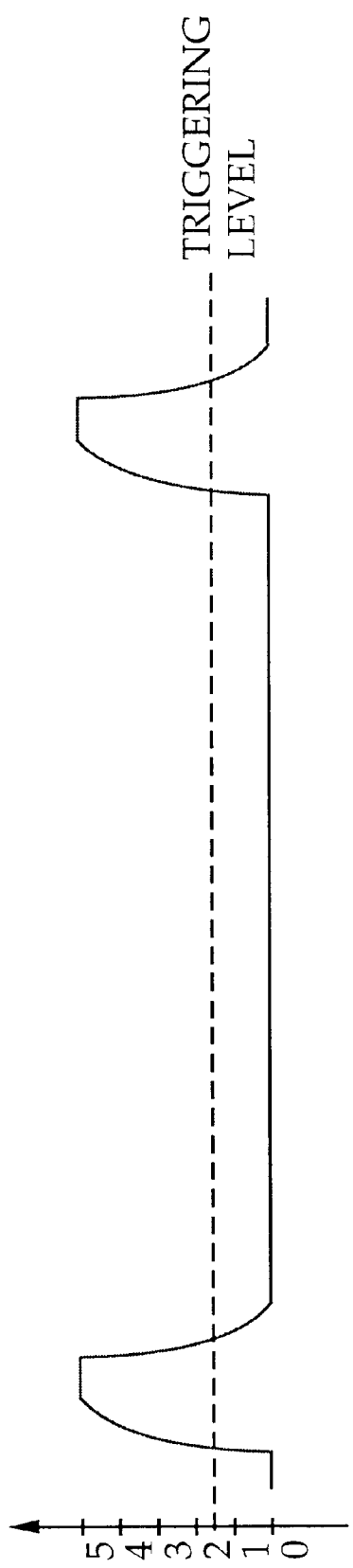
FIGS. 1A and 1B illustrate the exponential shape of the sync pulses.
Figure 1B:
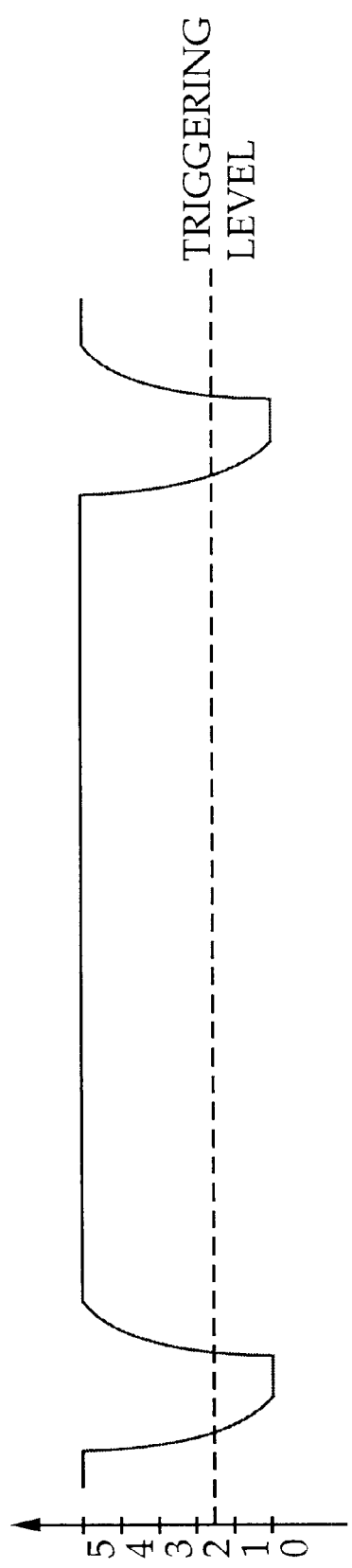
Figure 2:
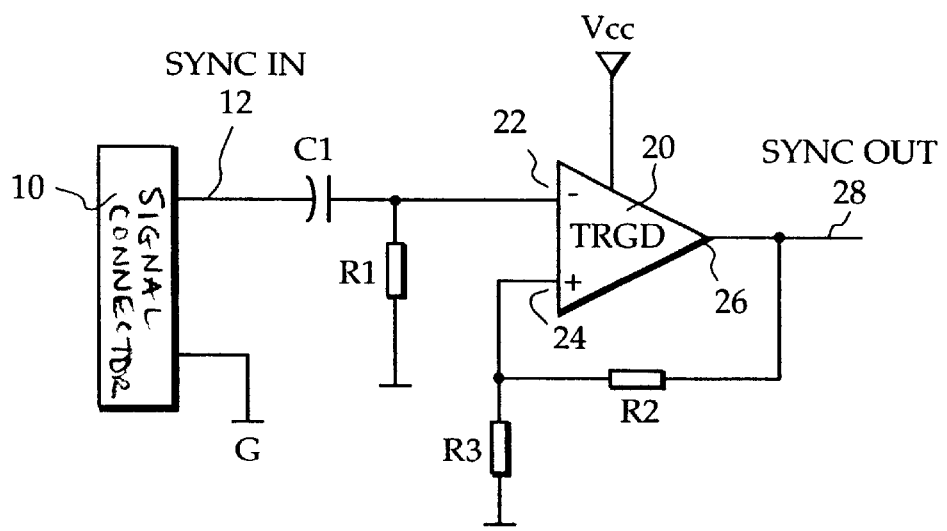
FIG. 2 illustrates the principle of the filtered sync detection, according to the present invention.

Referring now to FIG. 2, there is shown a filtered sync detector to receive incoming sync signals 12 (SYNC IN) from a signal cable connector 10, in reference to a ground signal G. The incoming sync signals 12 are filtered by an RC timing circuit consisting of a capacitor C1 and a resistor R1. The filtered signals are conveyed to the negative input terminal 22 of a triggerable device (TRGD) 20 which has a signal output 26. A feedback path consisting of resistors R2 and R3 is used to provide a triggering threshold to the positive input terminal 24 of the triggerable device 20. As shown, resistor R2 and resistor R3 are connected in series to form a voltage divider with R2 being connected to the signal output 26 and R3 being connected to the signal ground.

Figures 3A, 3B, 3C:
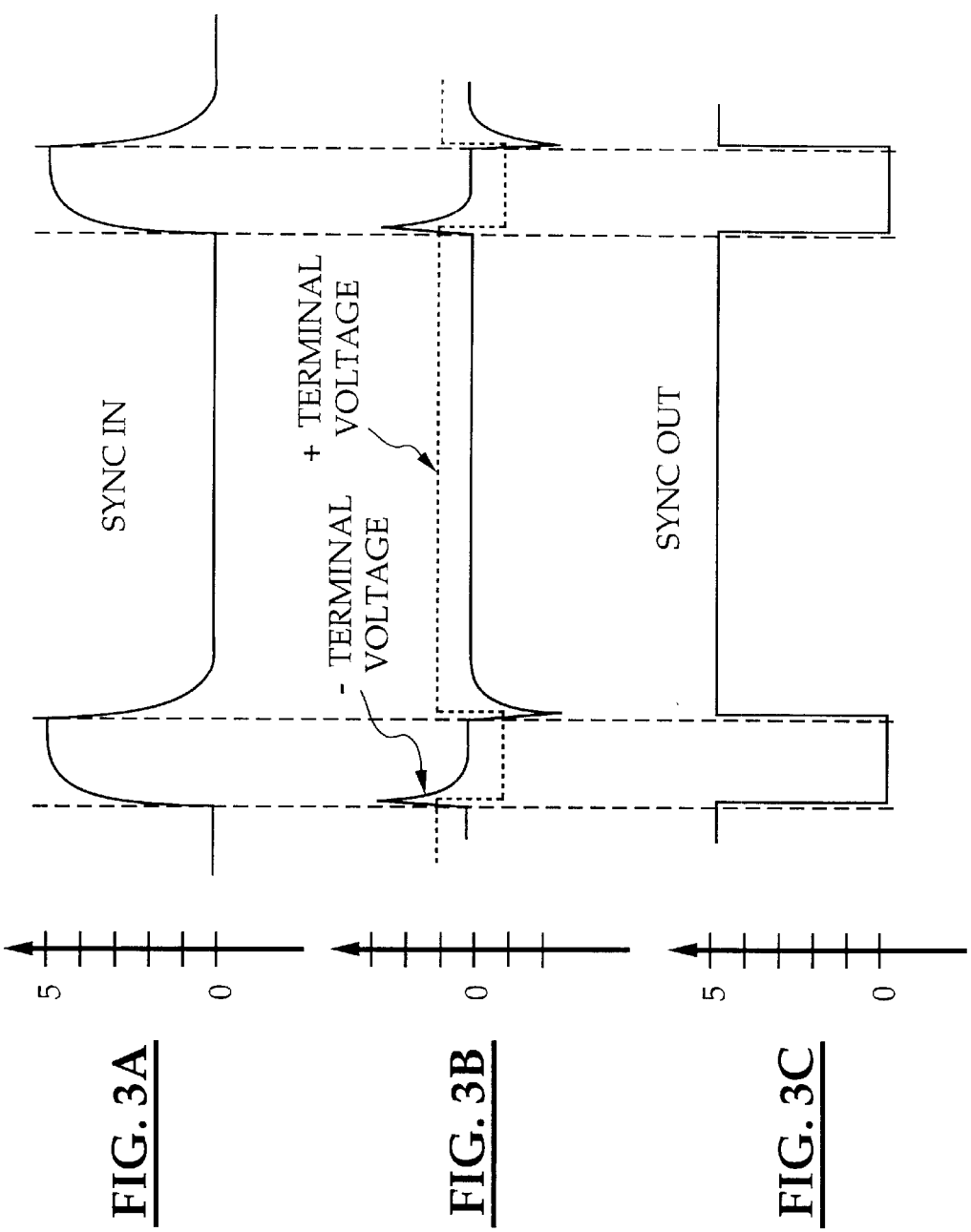
FIGS. 3A–3C illustrate the signal waveform at different points in the filtered sync detector of FIG. 2.

FIGS. 3A–3C illustrate the signal waveform at different points in the filtered sync detector of FIG. 2. In FIG. 3A, there is shown the waveform of typical sync signals (SYNC IN) received from a sync cable connector 10. In this case, the polarity of the sync pulses is positive. FIG. 3B illustrates the waveform of the signals at positive terminal 24 and negative terminal 22 of the triggerable device. At the negative terminal, the incoming signals are differentiated by the high pass filter C1/R1, forming a short spike from the leading edge of each incoming sync pulse and another spike from the trailing edge. The voltage at the positive terminal is a scaled-down feedback signal from the output signal 28. Whenever there is a voltage crossover between the signals at the positive and negative terminals, a voltage transition occurs at the output 26 of triggerable device 20, thereby producing the SYNC OUT signals which are substantially in the form of a rectangular wave, with a steep slope in both the leading edge and the trailing edge, as shown in FIG. 3C. For that reason, either the leading edge or the trailing edge of the SYNC OUT signals is suitable for triggering a line scan, if desired. With such a steep slope, the line deflection circuit in a monitor is immune from the noise and interference that would be expected in a computer system, thereby producing a virtually jitter free horizontal scanning frequency. It should be noted that the triggering threshold provided to the positive input terminal 24 of the triggerable device 20 can be adjusted by changing the values of R2 and R3 to adjust the triggering level according to the needed noise margin. The triggering threshold can also be adjusted by the timing of the filter R1C1.

Figure 4:
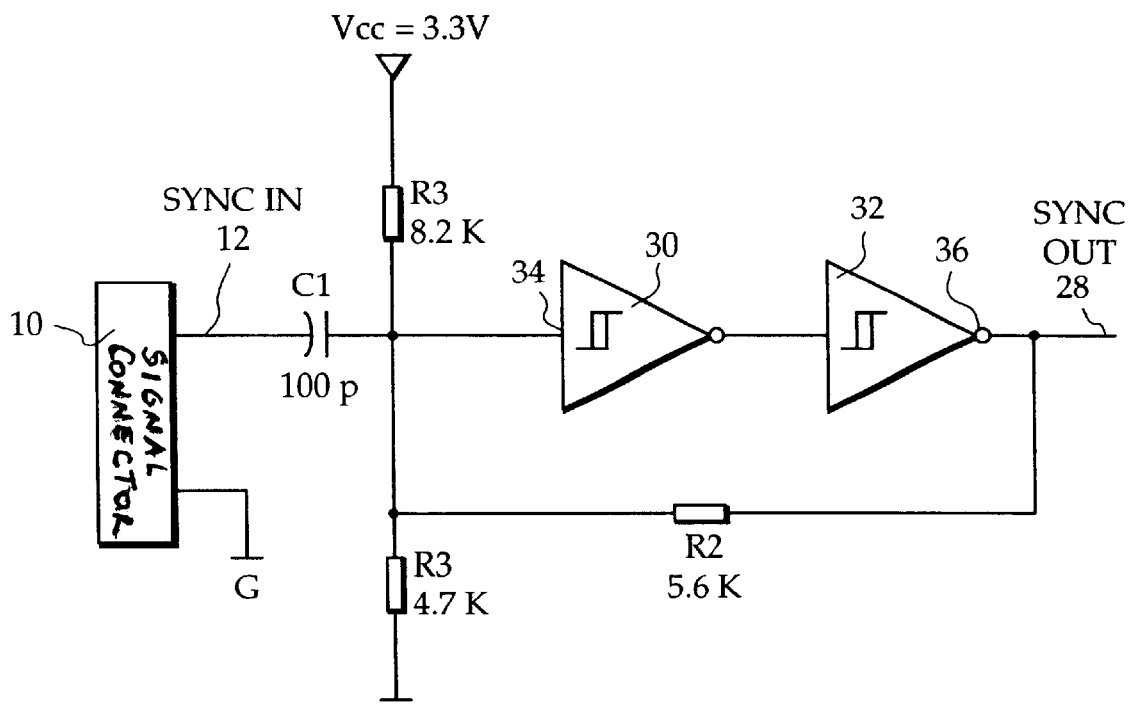
FIG. 4 illustrates an example of the practical embodiments of the present invention.

FIG. 4 illustrates a practical circuit for filtered sync detection. In FIG. 4, there are shown two inverting Schmitt-triggers 30 and 32 being used to form a triggerable device. As shown, the output 36 of Schmitt-trigger 32 is used to provide the improved sync signals 28 to the horizontal scan control or the line deflection circuit in a monitor. In this embodiment, resistor R1 is connected to the supply voltage Vcc, instead of the the filtered sync signals from capacitor C1 are conveyed to the same input 34 of the triggerable device. The values of the capacitor and resistors are for illustrative purposes only. It should be noted that the two inverting Schmitt-triggers can be replaced by similar inverters or one or more non-inverting Schmitt-trigger.

Figure 5:
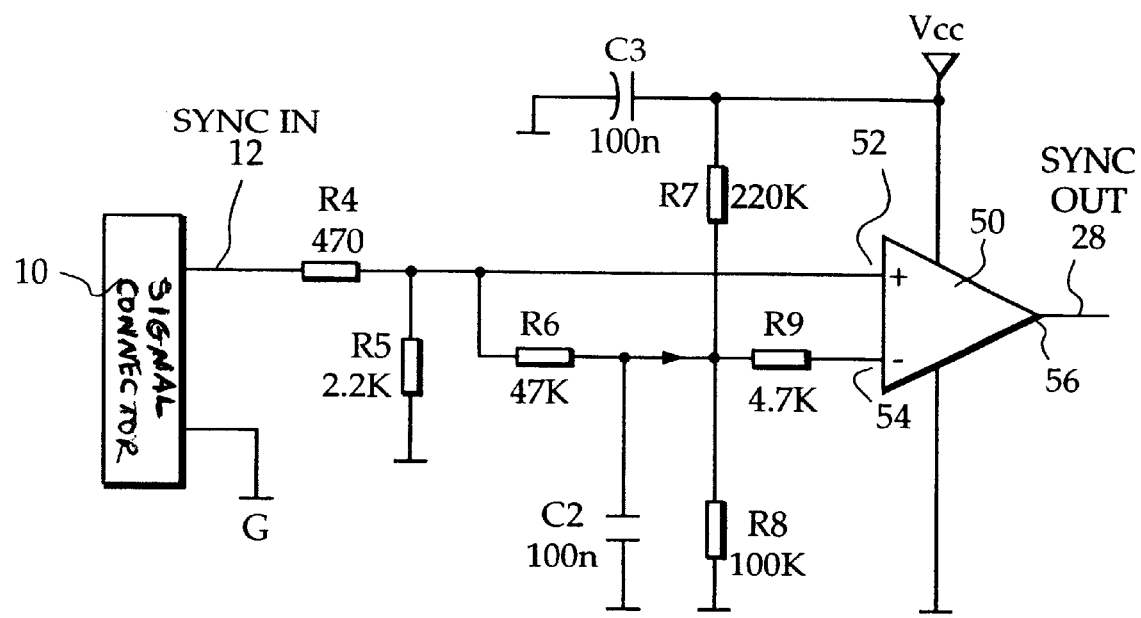
FIG. 5 illustrates the preferred embodiment of the present invention.

FIG. 5 illustrates the preferred embodiment of the present invention. In FIG. 5, there is shown a voltage comparator, preferably a fast comparator 50, being used to generate the improved sync signals 28 from its signal output 56. The improved sync signals 28 are substantially in the form of a rectangular wave. As shown, the incoming sync signals 12 may be scaled down via an optional voltage divider comprising resistors R4 and R5. The scaled down signals are directly fed to the positive terminal 52 of the comparator 50. The scaled down signals are also filtered by a timing filter consisting of resistor R6 and capacitor C2. The filtered signals, along with a reference voltage from the voltage divider R7/R8, are fed to the negative terminal 54 of comparator 50 via an optional protection resistor R9. The voltage divider R7/R8 sets a bias voltage for the comparator reference input 54. If the polarity of the incoming sync signals 12 is negative, the sync signals comprise a +5V DC level and negative pulses. Although the sync signals 12 are fed to both the positive terminal 52 and negative terminal 54 to tune the triggering point, the pulses in the incoming signals fed to negative terminal 54 are properly filtered out by the timing circuit R6/C2. Thus, substantially only the DC level of the incoming signals is fed to the negative terminal 54 to raise the bias voltage at the negative terminal 54 up to about +4V so as to allow the triggering point to be set at the steep slope portion of the leading edge of the sync pulses. If the polarity of the incoming signals 12 is positive and the sync signals comprise a 0V DC level and positive pulses, the bias voltage at the negative terminal 54 is raised up to about +1V so as to allow the triggering point to be set at the steep slope portion of the leading edge of the sync pulses. It is understood that the voltage level of the signals 28 at the signal output 56 is caused to change whenever there is a cross-over between the voltage levels at the negative and the positive terminal 52, 54. Thus, when the bias voltage at the negative terminal 54 equals a voltage associated with the leading edge of the incoming sync pulses as fed to the positive terminal 52, the lead edge of the sync pulse of the improved sync signals 28 is produced. It should be noted that the bias voltage at the negative input terminal 54 can be adjusted so that the difference between the bias voltage and the DC level can be tuned within the range of +0.8 to 2.2 V, or a broader range, if desired. Also, the values of the resistors and capacitors are for illustrative purposes only.

Figure 6:
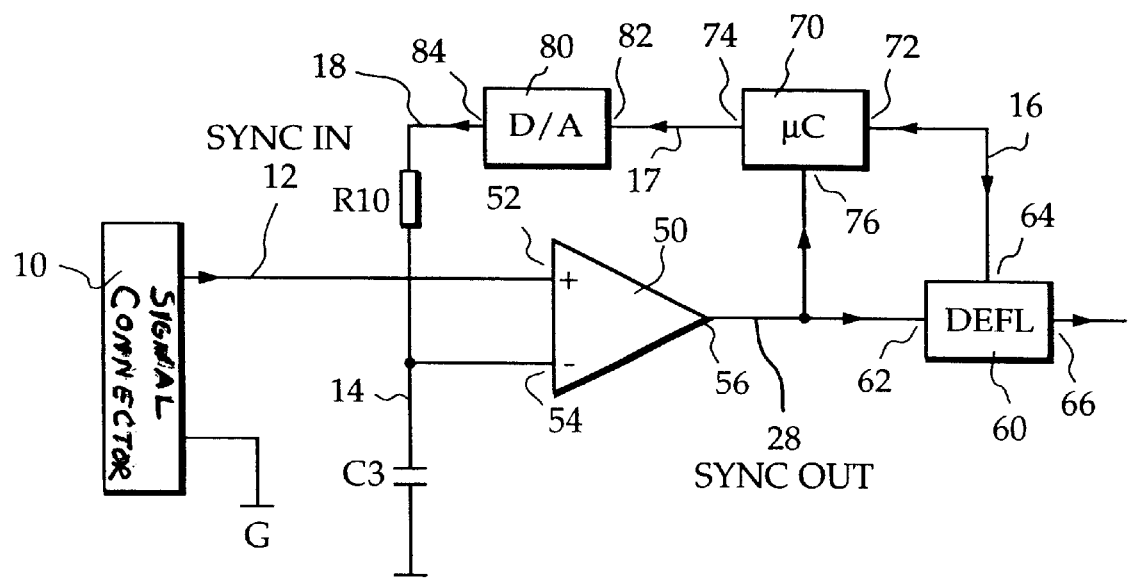
FIG. 6 illustrates another embodiment of the present invention.

FIG. 6 illustrates yet another embodiment of the present invention. In FIG. 6, there is shown a triggerable device, or voltage comparator 50, being used to generate the improve sync signals 28 from its signal output 56. The improved sync signals 28 are substantially in the form of a rectangular wave. As shown, incoming sync signals 12 are fed directly to one input terminal 52 of the voltage comparator 50, while a reference voltage 14 is provided to the other input terminal 54. The improved sync signals 28 is provided to the input 62 of a deflection circuit 60 for line scanning. Sync signals 28 are also provided to an input 76 of a micro-controller 70 which provides a digital reference signal 17 to a digital-to-analog (D/A) converter 80. D/A converter 80 converts signal 17 into an analog signal 18. If the analog signal 18 contains noise, it is optionally filtered by a timing filter (R10/C3) as the reference voltage is provided to input terminal 54. If the voltage level of the incoming sync signals is within the range of 0 to +5V, regardless of its polarity, then reference voltage 14 is always set to a value which is smaller than +5V but greater than 0V. Therefore, the polarity of the improved sync signals 28 is always the same as the polarity of the incoming sync signals 12. The micro-controller 70 is programmed to recognize the polarity of sync signal 28. If the polarity is positive (i.e. DC level=0V) and the leading edge is used for triggering, then the reference voltage is set at about +1V by the micro-controller 70 so that the triggering point is set at the steep slope portion of the leading edge of the incoming sync pulses. If the polarity is negative (i.e. DC level=+5V) and the leading edge is used for triggering, then the reference voltage is set at about +4V. Again, the triggering point is set at the steep slope portion of the leading edge of the incoming sync pulses. In these cases, the triggering point at the trailing edge is irrelevant and the difference between the DC level of the incoming sync signals and the reference voltage is about 1V. But this difference can be adjusted to be within the range of 0.8 to 2.2V or any other values, depending on the DC level and the amplitude of the incoming sync pulses. Similarly, when the trailing edge is used for triggering, the micro-controller 70 will set the reference voltage according to the polarity of the sync signals. Alternatively, micro-controller 70 recognizes the polarity of the incoming sync signals from a signal 16 conveyed from the deflection circuit 60.

The filtered sync detection method and device, according to the present invention, can be used on a monitor having a CRT display, a LCD display panel or other types of information display devices. They can be also be used on a projection device, a television set, a line-scan printing/exposing device, or any device that utilizes sync signals to trigger the line scanning of an image. Furthermore, the filtered sync detection method and device can be used on a system wherein sync signals are provided via a cable or any other sync signals carrying medium or external means, and they can also be used on a system wherein sync signals are generated or regenerated within the system. The disclosed method and device can be used to clean up sync signals that are distorted by noise, interference, impedance mismatch, cable capacitance, attenuation, etc., and they can also be used to clean up sync signals that have unacceptable variations in pulse is amplitude or/and pulse width, caused by mechanical, electrical, optical means or otherwise. The same method and device can also be used to improve the vertical synchronization signals and other types of synchronization signals.

Therefore, although the invention has been described with respect to the preferred versions and embodiments thereof, it will be understood by those skilled in the art that the foregoing and various other changes, omissions and deviations in the form and detail thereof may be made without departing from the spirit and scope of this invention

What is claimed is:

1. In a system using an incoming sync pulse to start a line scan, wherein said incoming sync pulse has a leading edge and a trailing edge, each edge having a slope with a steep portion leading to a gradual portion and the leading edge having a slope sign opposite the slope sign of the trailing edge, a method of improving the consistency in line scanning comprising the steps of:

selecting the steep slope portion in the leading edge of said incoming sync pulse;

setting a first triggering point at the steep slope portion of the leading edge independently of the slope sign; and generating a new sync pulse substantially in the form of a rectangular wave having a first edge and a second edge wherein the first edge substantially starts at the first triggering point.

2. The method of claim 1 wherein the first edge has a negative slope and the second edge has a positive slope.

3. The method of claim 1 wherein the first edge has a positive slope and the second edge has a negative slope.

4. The method of claim 1 wherein the first edge of the new sync pulse and the leading edge of the incoming sync pulse have the same slope sign.

5. The method of claim 1 wherein the first edge of the new sync pulse and the leading edge of the incoming sync pulse have opposite slope signs.

6. The method of claim 1 further comprising the step of detecting the polarity of the incoming pulse.

7. The method of claim 1 further having the steps of:

selecting the steep slope portion in the trailing edge of said incoming sync pulse; and setting a second triggering point at the steep slope portion of the trailing edge independently of the slope sign so as to allow the second edge of the new sync pulse to start substantially at the second triggering point.

8. A device for generating a new sync pulse (28) from an incoming sync pulse (12) having a leading edge and a trailing edge, each edge having a steep slope portion leading to a gradual slope portion, wherein the leading edge has a slope sign opposite the slope sign of the trailing edge and wherein the new sync pulse is substantially in the form of a rectangular wave having a first edge and a second edge, said device comprising:

means for selecting the steep slope portion of the leading edge of the incoming sync pulse;

means for setting a first triggering point at the selected steep slope portion of the leading edge independently of the slope sign; and means for generating said new sync pulse such that the first edge starts substantially at the first triggering point.

9. The device of claim 8 wherein said selecting means comprises an RC timing circuit (R1/C1).

10. The device of claim 8 wherein said pulse generating means comprises a triggerable device (20; 30/32).

11. The device of claim 10, wherein the triggerable device (20) comprises a voltage comparator.

12. The device of claim 8 further having a signal ground (G) and a supply voltage (Vcc), wherein said generating means comprises a triggerable device (20) having a first signal input (22), a second signal input (24), and a signal output (26);

said selecting means comprises a first resistor (R1) and a capacitor (C1) wherein one end of the capacitor (C1) receives the incoming sync signal (12) and the other end of the capacitor (C1) is connected for providing signals to the first signal input (22) of the triggerable device (20), and one end of the first resistor (R1) is connected for providing signals to the first signal input (22) and the other end of the second resistor (R1) is connected to the signal ground (G); and said triggering point setting means comprises a voltage dividing feedback path (R2, R3) having two ends and a middle point with the two ends respectively connected to the signal ground and the signal output (26) for receiving signals, and the middle point connected for providing signals to the second signal input (24) of the triggerable device (20).

13. The device of claim 8 further having a signal ground (G) and a supply voltage (Vcc), wherein said generating means comprises a triggerable device (30, 32) having a signal input (34), and a signal output (26);

said selecting means comprises a first resistor (R1) and a capacitor (C1) wherein one end of the capacitor (C1) receives the incoming sync signal (12) and the other end of the capacitor (C1) is connected for providing signals to the signal input (34) of the triggerable device (30, 32), and one end of the first resistor (R1) is connected for providing signals to the signal input (34) and the other end of the second resistor (R1) is connected to the supply voltage (Vcc); and said triggering point setting means comprises a voltage dividing feedback path (R2, R3) having two ends and a middle point with the two ends respectively connected to the signal ground and the signal output (36) for receiving signals, and the middle point connected for providing signals to the signal input (34) of the triggerable device (30, 32).

14. The device of claim 13 wherein the triggerable device comprises at least two inverting Schmitt triggers (30, 32).

15. The device of claim 8 wherein said selecting means and said triggering point setting means comprise a micro-controller (70).

16. The device of claim 15 further having a signal ground (G) wherein said generating means comprises a triggerable device (50) having a first signal input (52) for receiving the incoming sync signal (12), a second signal input (54) and a signal output (56);

said micro-controller (70) having a signal input (76) to receive signals from the signal output (56) of the triggerable device (50) for detecting the slope sign of the leading edge of the incoming sync pulse (12), and a signal output (74) for providing a reference voltage (14) to the second signal input (54) in accordance with the slope sign of the leading edge so as to set the triggering point at the steep slope portion of the leading edge of the incoming sync pulse (12).

17. The device of claim 16 further comprising filtering means (R10/C3) for filtering noise in signals (17) provided to the second input (54) of the triggerable device (50).

18. The device of claim 16 wherein said triggerable device (50) comprises a voltage comparator.

19. The device of claim 16 wherein the reference voltage (14) provided at the signal output (74) of the microcontroller is a digital signal, said device further comprising means (80) for converting said digital signal (17) into an analog signal (18).

20. The device of claim 8, wherein the selecting means further selects the steep portion of the trailing edge of the incoming sync pulse, and the setting means further sets a second triggering point at the selected steep portion of the trailing edge independently of the slope sign so as to allow the second edge of the new sync pulse to start substantially at the second triggering point.

21. In a system using incoming sync signals comprising a DC level and a multiplicity of sync pulses for the synchronization of line scanning, wherein said sync pulses have a substantially fixed amplitude having a first voltage level, wherein each of said sync pulses has a leading edge having a slope with a steep portion leading to a gradual portion, and the leading edge is used to trigger the start of a line scan in reference to a triggering level, a method of improving the consistency in line scanning comprising the steps of:

filtering out the sync pulses in said incoming sync signals so as to produce a reference signal having a second voltage level between the DC level and said first voltage level;

utilizing said second voltage level as the triggering level for triggering the start of a line scan.

22. The method of claim 21 wherein a voltage comparator is used to produce a new sync pulse from each incoming sync pulse, and wherein said voltage comparator has a first terminal receiving a first signal, a second terminal for receiving a second signal, and an signal output for providing an output level, said method further comprising the steps of simultaneously providing the reference signal to the first terminal as the first signal, and providing the incoming sync signals to the second terminal as the second signal;

causing a change in the output level at the signal output of the comparator whenever the voltage level of the first signal equals the voltage level of the second signal.

23. The method of claim 21 wherein the voltage difference between the DC level and the reference signal is ranging from 0.8 to 2.2V.

24. The method of claim 21 wherein the voltage difference between the DC level and the reference signal is substantially equal to +1V.

25. The method of claim 21 wherein the voltage difference between the DC level and the reference signal is adjustable.

26. In a system using incoming sync signals (12) comprising a DC level and a multiplicity of sync pulses for the synchronization of line scanning, wherein said sync pulses have a substantially fixed amplitude having a first voltage level and wherein each of said sync pulses has a leading edge having a slope with a steep slope portion leading to a gradual slope portion, a device having a signal output (56) for generating a new sync pulse from an incoming sync pulse wherein the new sync pulse is substantially in the form of a rectangular wave having a first edge and a second edge, said device-comprising:

means for producing a reference signal having a second voltage level by filtering the sync pulses in the incoming sync signals wherein said second voltage level is between the DC level and the first voltage level; and means for comparing the reference signal and the incoming sync signals so as to produce the first edge of the new sync pulse whenever the first voltage level equals a voltage level associated with the leading edge of the incoming sync pulses.

27. The device of claim 26 wherein said reference signal producing means comprising a time filter (R6, C2).

28. The device of claim 26 wherein said reference signal producing means comprises a voltage divider (R7, R8).

29. The device of claim 26 wherein said comparing means comprises a voltage comparator having a first input terminal

(52) for receiving the incoming sync signals and a second input terminal (54) for receiving the reference signal.

30. The device of claim 26 further comprising a voltage divider (R4, R5) for scaling the incoming sync signals.

31. The device of claim 26 further having a signal ground (G) and a supply voltage (Vcc), wherein said comparing means comprises a voltage comparator (50) having a first signal input (52) for receiving the incoming sync signals (12) and a second signal input (54);

said producing means comprises a first resistor (R6) and a capacitor (C2) wherein one end of the first resistor (R6) is connected to the first signal input (52) for receiving the incoming sync signals (12) and another end of the first resistor (R6) is connected for providing signals to the second signal input (54), and one end of the capacitor (C2) is connected for providing signals to the second signal input (54) and the other end of the capacitor is connected to the signal ground (G); and wherein said device further comprises a bias voltage producing means including a voltage divider (R7, R8) having two ends and a middle point with the two ends respectively connected to the signal ground (G) and the supply voltage (Vcc) and the middle point providing signals to the second signal input (54) of the comparator (50).

32. A device for providing new sync signals (28) to a deflector circuit for the synchronization of line scanning, said new sync signals having a multiplicity of new sync pulses from an incoming sync signals (12) having a DC level and a multiplicity of first sync pulses having a substantially fixed amplitude voltage, each pulse having a first edge and a second edge, each edge having a steep slope portion leading to a gradual slope portion, wherein the first edge has a slope sign opposite the slope sign of the second edge and wherein the new sync pulse is substantially in the form of a rectangular wave having a third edge and a fourth edge, said device comprising:

means for detecting the slope sign of the first edge;

means for setting a first triggering point at the steep slope portion of the first edge; and means for generating the new sync pulse such that the third edge starts substantially at the first triggering point.

33. The device of claim 32 wherein the detecting means and the setting means comprise a micro-controller (70), and the generating means comprising a triggerable device (50).

34. The device of claim 33 wherein:

said triggerable device (50) having a first signal input (52) for receiving the incoming sync signals (12), a second signal input (54) and a signal output (56) for providing the new sync signals;

said micro-controller (70) has a first signal input (76) to receive the new sync signals and a signal output (74) for providing a reference voltage (14) to the second signal input (54); such that the reference voltage has a level between the DC level and said amplitude voltage level.

35. The device of claim 34 wherein the difference between the DC level and said reference voltage is substantially equal to 1V.

36. The device of claim 34 wherein the difference between the DC level and said reference voltage is within the range of 0.8 to 2.2V.

37. The device of claim 34 wherein the difference between the DC level and said reference voltage is adjustable.

38. The device of claim 33 wherein said incoming sync signals has a DC level and said first sync pulses have an amplitude voltage level, wherein:

said triggerable device (50) having a first signal input (52) for receiving the incoming sync pulse (12) and a second signal input (54) and a signal output (56) for providing the new sync signals;

said micro-controller (70) has a second signal input (72) to receive the signals (17) from said deflection circuit and a signal output (74) for providing a reference voltage (14) to the second signal input (54); such that the reference voltage has a level between the DC level and said amplitude voltage level.

* * * * *

UNITED STATES PATENT AND TRADEMARK OFFICE
CERTIFICATE OF CORRECTION

PATENT NO. : 6,597,352 B1
DATED : July 22, 2003
INVENTOR(S) : Hannu Haapakoski et al.

It is certified that error appears in the above-identified patent and that said Letters Patent is hereby corrected as shown below:

<u>Column 1,</u>
Line 40, "TFL" should be -- TTL --.

<u>Column 5,</u>
Line 57, "is" should be deleted.

<u>Column 7,</u>
Line 60, "microcontroller" should be -- micro-controller --.

Signed and Sealed this

Eleventh Day of November, 2003

JAMES E. ROGAN
*Director of the United States Patent and Trademark Office*